(12) United States Patent
Mo

(10) Patent No.: US 10,155,459 B2
(45) Date of Patent: Dec. 18, 2018

(54) ADJUSTMENT MECHANISM AND CHILD SAFETY SEAT THEREWITH

(71) Applicant: BP Children's Products HK Co., Limited, Wanchai (HK)

(72) Inventor: Xiao-Long Mo, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 94 days.

(21) Appl. No.: 15/356,648

(22) Filed: Nov. 20, 2016

(65) Prior Publication Data

US 2017/0166097 A1    Jun. 15, 2017

(30) Foreign Application Priority Data

Dec. 11, 2015    (CN) .......................... 2015 1 0916653

(51) Int. Cl.
*B60N 2/28* (2006.01)

(52) U.S. Cl.
CPC ......... *B60N 2/2875* (2013.01); *B60N 2/2821* (2013.01)

(58) Field of Classification Search
CPC .............................. B60N 2/2875; B60N 2/2878
See application file for complete search history.

(56) References Cited

U.S. PATENT DOCUMENTS

| | | | | |
|---|---|---|---|---|
| 5,890,762 A * | 4/1999 | Yoshida | ............... | B60N 2/2821 297/130 |
| 6,196,629 B1 * | 3/2001 | Onishi | ................. | B60N 2/2806 297/256.12 |
| 6,679,552 B1 * | 1/2004 | Kassai | ................. | B60N 2/2812 297/250.1 |
| 9,738,182 B2 * | 8/2017 | Pos | ....................... | B60N 2/2878 |
| 2016/0059747 A1 * | 3/2016 | Pos | ...................... | B60N 2/2812 297/183.6 |
| 2016/0144749 A1 * | 5/2016 | Mo | ......................... | B60N 2/22 297/256.11 |
| 2017/0129370 A1 * | 5/2017 | Chen | .................... | B60N 2/2878 |

FOREIGN PATENT DOCUMENTS

| | | | |
|---|---|---|---|
| DE | 689 04 946 T2 | 6/1993 | |
| DE | 10 2006 039 486 B3 | 1/2008 | |
| DE | 20 2014 106 183 U1 | 2/2015 | |
| EP | 0363556 A1 | 4/1990 | |
| EP | 0 462 930 A1 | 12/1991 | |
| EP | 1 813 469 B1 | 10/2011 | |
| EP | 3 165 400 A1 | 5/2017 | |
| JP | 2009113791 A * | 5/2009 | ........... B60N 2/2821 |

* cited by examiner

Primary Examiner — Timothy J Brindley
(74) Attorney, Agent, or Firm — Winston Hsu

(57) ABSTRACT

A child safety seat includes a base and a seat part. The seat part includes a back portion and a sitting portion, which are movably disposed on the base and are pivotally connected with each other. An adjustment mechanism for the child safety seat includes a positioning structure and a dragging part. The positioning structure is movably disposed on the base or the seat part. The dragging part extends toward the positioning structure. The positioning structure selectively fixes or releases the dragging part. When the dragging part is released by the positioning structure, a manipulator can manipulate the dragging part to make the sitting portion and the back portion relatively pivot to switch the child safety seat between a lying status and a sitting status. Thereby, the manipulator can conveniently and quickly adjust the child safety seat through the adjustment mechanism.

25 Claims, 11 Drawing Sheets

ADJUSTMENT MECHANISM AND CHILD SAFETY SEAT THEREWITH

BACKGROUND OF THE INVENTION

1. Field of the Invention

The invention relates to a child product, and especially relates to an adjustment mechanism and a child safety seat with the adjustment mechanism.

2. Description of the Prior Art

As the society advances in economy and technology, people are provided with a much variety of consumer goods for higher quality of life. Child safety seats are one kind of the various consumer goods.

It is widely known that child safety seats are designed for children by enterprises, which can effectively ensure the safety of a child sitting on the child safety seat. Therefore, people like the child safety seats very much, which increases the popularity of the child safety seats.

Present child safety seats include a back portion and a sitting portion. When sitting on the sitting portion of one present child safety seat, a child reclines against the back portion by his back so that the child sits on the child safety seat upright. When the child needs to lie down, the child will feel uncomfortable because the child safety seat cannot meet the requirement for lying on the child safety seat, which unfavorable to the popularization and applications of the present child safety seats.

Therefore, there is a need for an adjustment mechanism, which can provide comfortable and safe sitting to child and can be easily manipulated by a user, and a child safety seat with the adjustment mechanism.

SUMMARY OF THE INVENTION

An objective of the invention is to provide an adjustment mechanism, which can provide comfortable and safe sitting to child and can be easily manipulated by a user.

Another objective of the invention is to provide a child safety seat, which can provide comfortable and safe sitting to child and can be easily manipulated by a user.

An adjustment mechanism according to the invention is used in a child safety seat. The child safety seat includes a seat part and a base. The seat part includes a back portion and a sitting portion. The back portion and the sitting portion are movably disposed on the base. The back portion and the sitting portion are connected with each other. The back portion and the sitting portion are rotatable relatively to make the child safety seat in a lying status or a sitting status. The adjustment mechanism includes a positioning structure and a dragging part. The positioning structure is movably disposed on the base or the seat part. The dragging part has a connection end and a manipulation end. The connection end is connected to the base. The manipulation end extends toward the positioning structure. The positioning structure selectively fixes or releases the manipulation end. When the positioning structure releases the manipulation end, the manipulation end can be manipulated by a manipulator to make the sitting portion and the back portion pivot relatively so that the child safety seat is switched between the lying status and the sitting status. When the positioning structure fixes the manipulation end, the child safety seat is fixed in the lying status or the sitting status.

Preferably, the adjustment mechanism further includes a positioning mount. The positioning mount is installed on the base. The positioning structure is movably disposed on the positioning mount. The positioning structure and the positioning mount clamp or release the manipulation end in a movement of the positioning structure relative to the positioning mount.

Preferably, a resilient part is connected to and between the positioning structure and the positioning mount. The positioning structure is movably disposed on the positioning mount. The resilient part has a tendency to drive the positioning structure to rotate to clamp the manipulation end.

Preferably, the positioning structure has a manipulation portion and a positioning portion. The manipulation portion is manipulated by the manipulator to make the positioning portion fix or release the manipulation end.

Preferably, the positioning mount is disposed under a portion of the base corresponding to the back portion.

Preferably, the dragging part is under the sitting portion and the back portion. The dragging part is disposed along lower outside walls of the sitting portion and the back portion in a direction from the front to the rear of the child safety seat.

Preferably, the connection end of the dragging part is under the sitting portion. The manipulation end of the dragging part is under the back portion. A fixing piece is installed where the connection end and the base are connected. The fixing piece fixes the connection end.

Preferably, an upper end of the back portion is pivotally connected with the base. A lower end of the back portion is pivotally connected with a rear end of the sitting portion.

Preferably, the dragging part is a flexible dragging part.

Preferably, the back portion and the sitting portion respectively are a plate structure.

Preferably, a limitation stopper is disposed on one of the base and the seat part. A long slot structure is disposed on the other one of the base and the seat part. The limitation stopper is slidably disposed in the slot structure.

Preferably, a restoring part is connected to and between the base and the seat part. The restoring part has a tendency to drive the sitting portion and the back portion to relatively pivot to switch the child safety seat to be in the sitting status.

A child safety seat according to the invention includes a seat part, a base, and the adjustment mechanism mentioned above. The seat part includes a back portion and a sitting portion. The back portion and the sitting portion are movably disposed on the base. The back portion and the sitting portion are pivotally connected with each other about a pivotal connection axis. The back portion and the sitting portion are rotatable relatively to make the child safety seat in a lying status or a sitting status. The manipulation end can be manipulated to switch the child safety seat between the lying status and the sitting status; a position of the pivotal connection axis changes as the child safety seat is switched.

Preferably, that the position of the pivotal connection axis changes is driven by the dragging part.

Compared with the prior art, according to the invention, the back portion and the sitting portion are movably disposed on the base. The back portion and the sitting portion are pivotally connected with each other. The back portion and the sitting portion are rotatable relatively to make the child safety seat in a lying status or a sitting status. Therefore, the child safety seat can be adjusted to be in the lying status or the sitting status by request of a child, so that the child safety seat can provide more comfortable sitting to the child and meet requests of children with different heights. Furthermore, the adjustment mechanism according to the invention includes a positioning structure and a dragging part. The positioning structure is movably disposed on the base or the seat part. The dragging part has a connection end and a manipulation end. The connection end is connected to the base. The manipulation end extends toward the positioning structure. The positioning structure selectively fixes or releases the manipulation end. Therefore, when the positioning structure releases the manipulation end, a manipulator can adjust the dragging part through the manipulation end so that the dragging part drives the sitting portion and the back portion to pivot relatively to switch the child safety seat between the lying status and the sitting status. Thereby, the switching of the child safety seat between the lying status and the sitting status is more convenient and quick. Furthermore, because the adjustment mechanism according to the invention can conveniently and quickly adjust the structural status of the child safety seat through the dragging part in coordination with the positioning structure, the adjustment mechanism is structurally simple.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
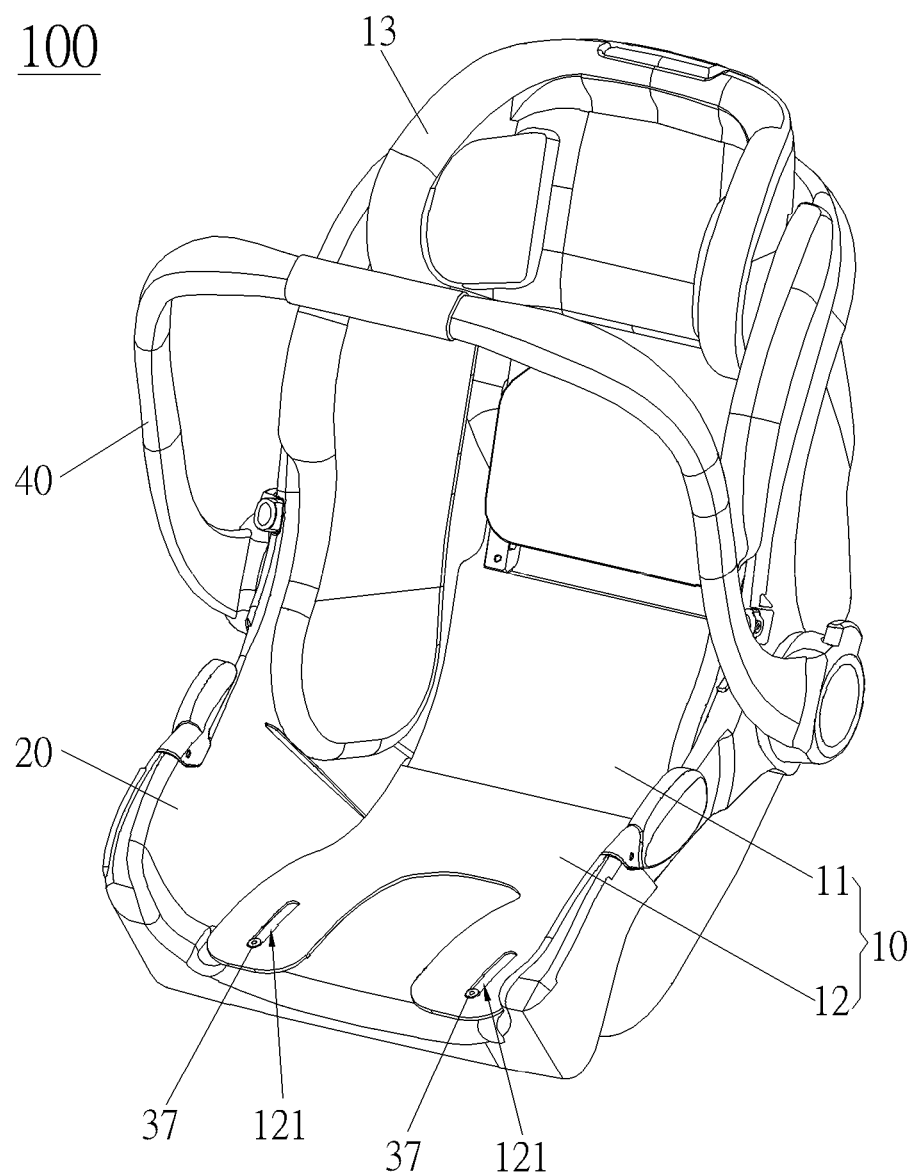
FIG. 1 is a schematic diagram illustrating a child safety seat of a first embodiment according to the invention when the child safety seat is in a sitting status.
Figure 5:
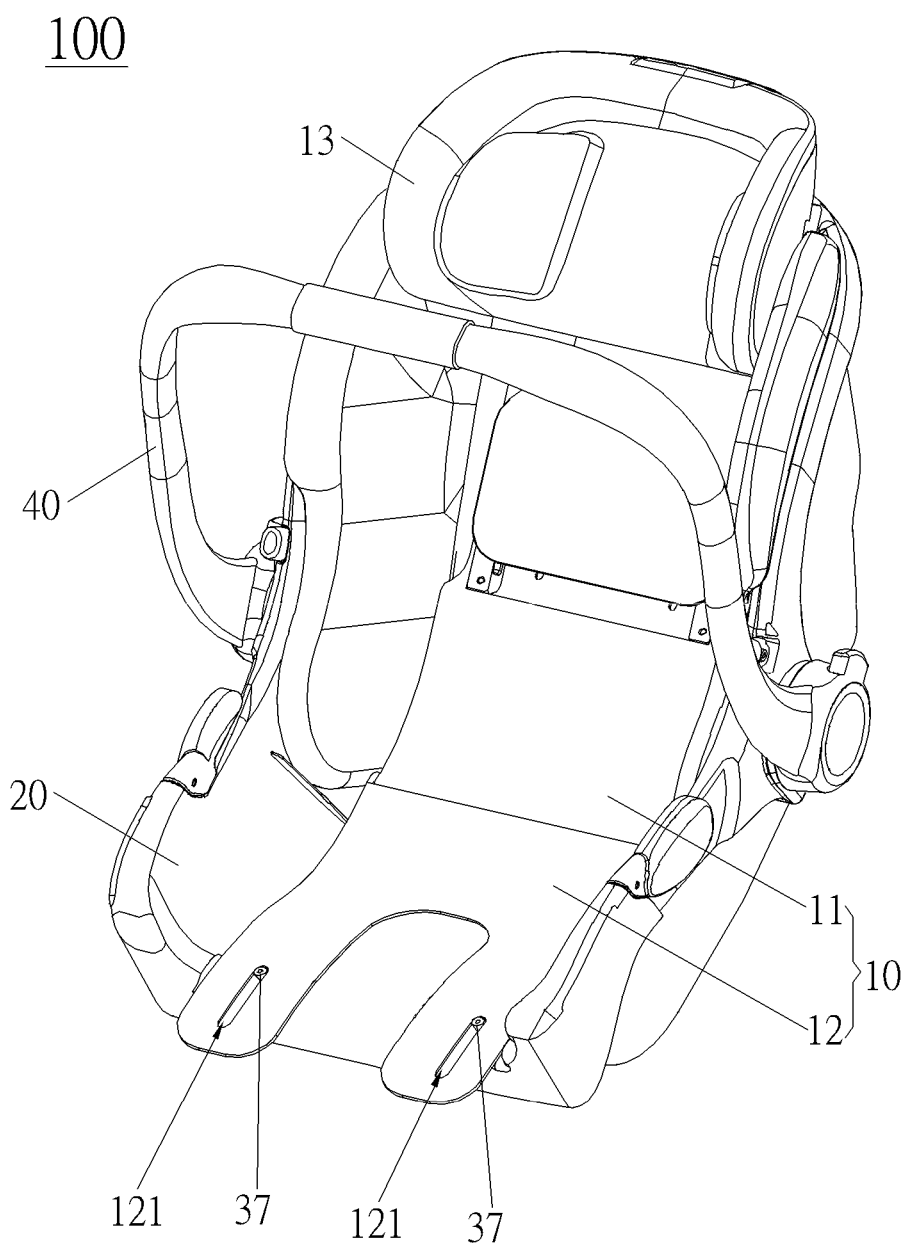
FIG. 5 is a schematic diagram illustrating the child safety seat of the first embodiment according to the invention when the child safety seat is in a lying status.
Figure 8:
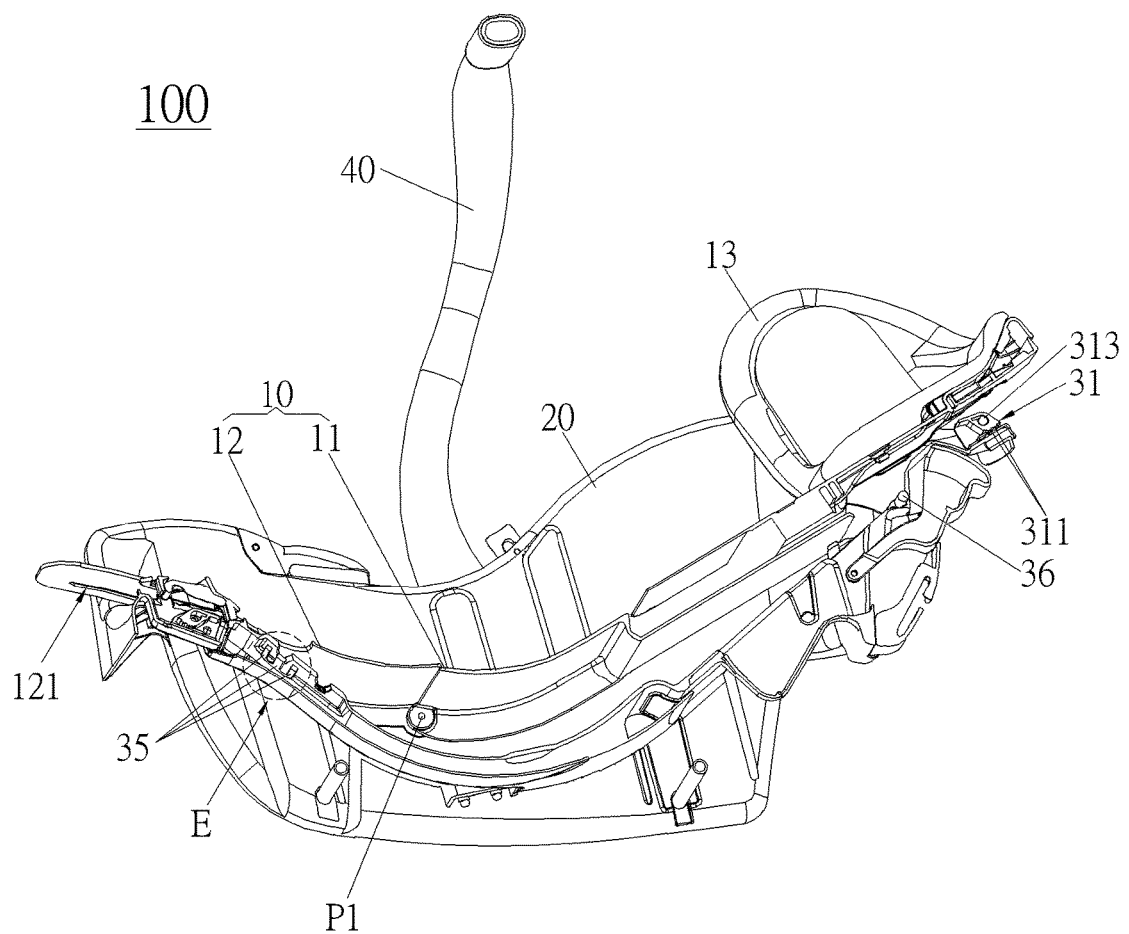
FIG. 8 is a sectional view of the child safety seat in FIG. 5 cut in the longitudinal direction for illustrating the inner structure of the child safety seat in another view point.

Please refer to FIG. 1, FIG. 5 and FIG. 8. A child safety seat 100 of a first embodiment according to the invention includes a seat part 10, a base 20, and an adjustment mechanism 30 (referring to FIG. 2). The seat part 10 includes a back portion 11 and a sitting portion 12. The back portion 11 and the sitting portion 12 are movably disposed on the base 20. The sitting portion 12 and the back portion 11 are pivotally connected with each other. The sitting portion 12 and the back portion 11 are rotatable relatively to make the child safety seat 100 in a lying status as shown in FIG. 5, FIG. 6, FIG. 8 or FIG. 10, or a sitting status as shown in FIG. 1 and FIG. 2.

Figure 2:
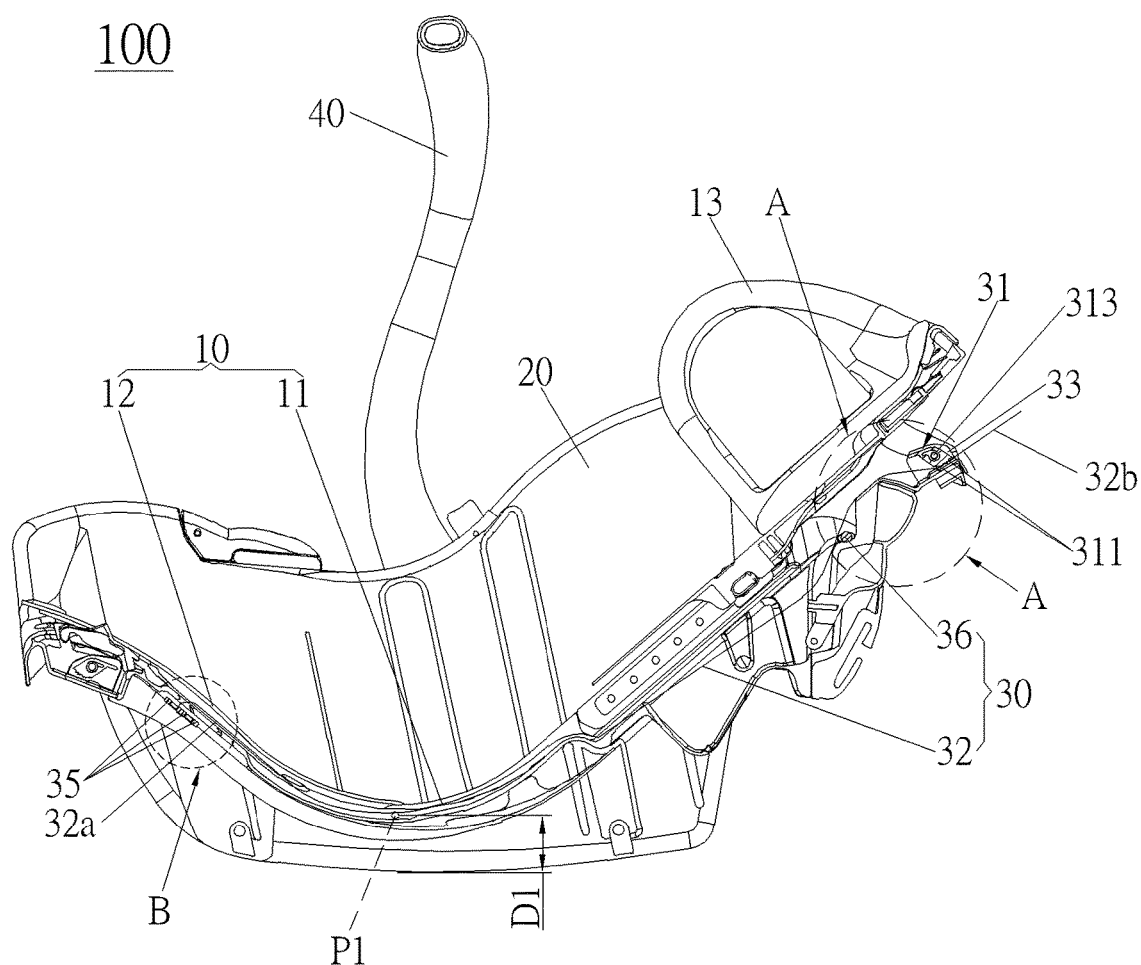
FIG. 2 is a sectional view of the child safety seat in FIG. 1 cut in a longitudinal direction for illustrating the inner structure of the child safety seat.
Figure 6:
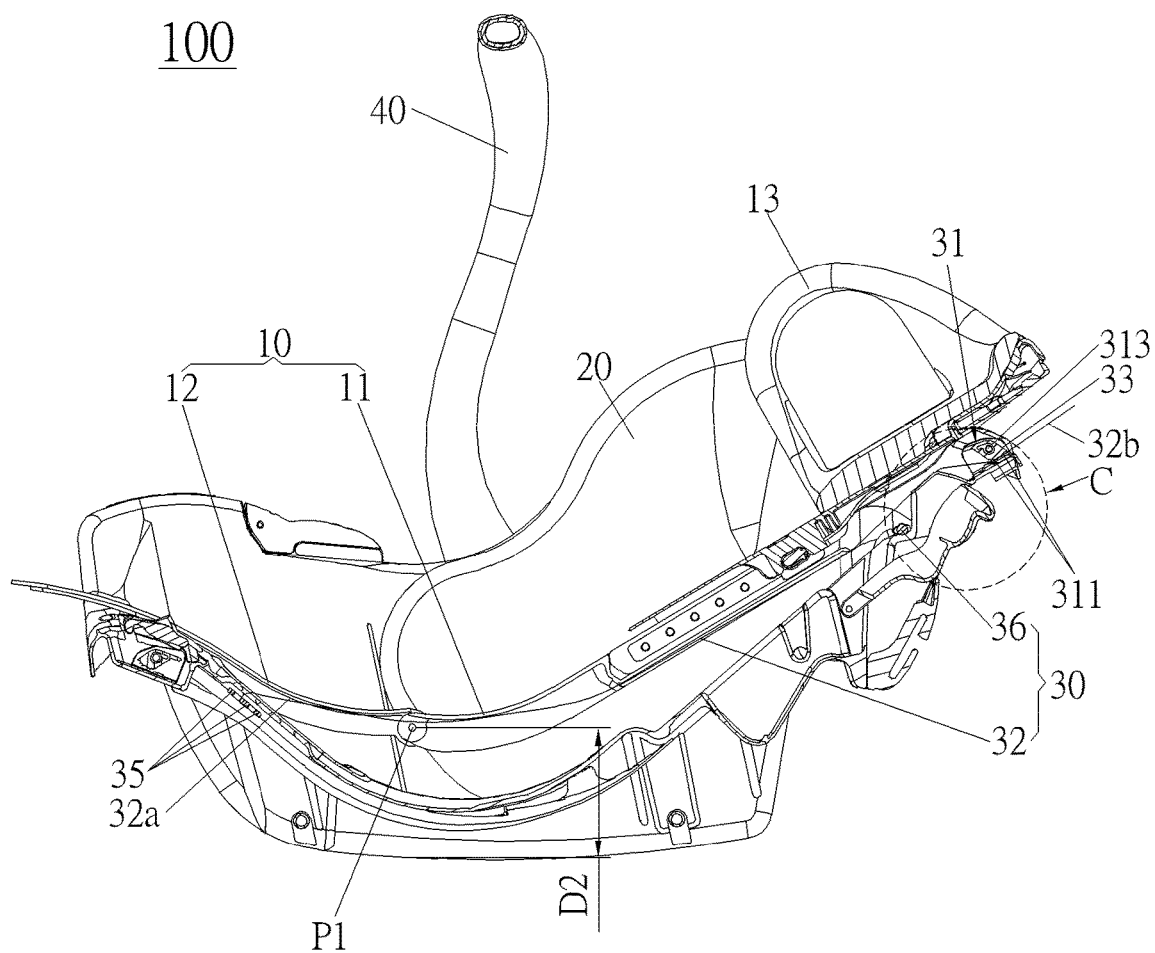
FIG. 6 is a sectional view of the child safety seat in FIG. 5 cut in the longitudinal direction for illustrating the inner structure of the child safety seat.
Figure 9:
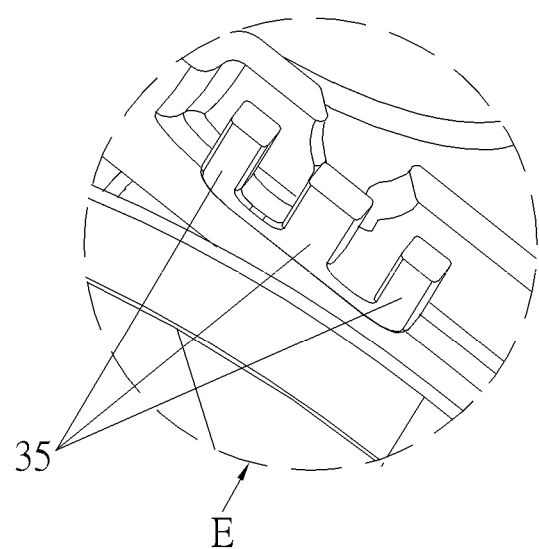
FIG. 9 is an enlarged view of the portion E in FIG. 8.

As shown in FIG. 2, FIG. 3, and FIG. 6 to FIG. 9, the adjustment mechanism 30 includes a positioning structure 31 and a dragging part 32. The positioning structure 31 is movably disposed on the base 20; however, the invention is not limited thereto. For example, the positioning structure 31 may be disposed on the seat part 10 by actual requests in other embodiments. In this embodiment, the positioning structure 31 is a positioning button, which facilitate positioning and is convenient for a manipulator to manipulate; however, the invention is not limited thereto. For example, the positioning structure 31 can be designed to be other structures by actual requests in other embodiments. In this embodiment, the dragging part 32 has a connection end 32a and a manipulation end 32b. Furthermore, as shown in FIG. 2 and FIG. 6, the connection end 32a is connected to the base 20 under the sitting portion 12; the manipulation end 32b is located under the back portion 11. Preferably, a fixing piece 35 is installed where the connection end 32a and the base 20. The fixing piece 35 is preferably located at the front side of the base 20 and is used for fixing the connection end 32a, so that the connection of the connection end 32a with the base 20 through the fixing piece 35 is more reliable. As shown by FIG. 4 and FIG. 9, the fixing piece 35 is located under the sitting portion 12 and is an E-shaped metal sheet for clamping the connection end 32a on the base 20 and for enhancing the mobility and fixity of the connection of the fixing piece 35 with the connection end 32a. Furthermore, the connection end 32a wraps around the fixing piece 35, which further enhances the reliability of the connection of the connection end 32a with the fixing piece 35; however, the invention is not limited thereto. For example, the connection end 32a can be designed to be connected with the seat part 10 by actual requests in other embodiments.

Furthermore, as shown in FIG. 2, FIG. 3, and FIG. 6 to FIG. 9, the manipulation end 32b of the dragging part 32 extends toward the positioning structure 31. The positioning structure 31 is used to selectively fix or release the manipulation end 32b. The positioning structure 31 is convenient for the manipulator to manipulate to release the manipulation end 32b when the child safety seat 100 of the first embodiment according to the invention is required to switch its structural status; the positioning structure 31 can fix the manipulation end 32b when the child safety seat 100 is in no need of switching its structural status. Thereby, the child safety seat 100 of the first embodiment according to the invention can be fixed in the lying status or the sitting status, which prevents the child safety seat 100 from unexpectedly moving. Therefore, the child safety seat 100 can reliably remain in the lying status as shown by FIG. 5 or FIG. 6 or in the sitting status as shown by FIG. 1 or FIG. 2. Preferably, in the embodiment, the dragging part 32 is a flexible dragging part, e.g. a webbing strap, which makes it easy to move the sitting portion 12 through the dragging part 32; however, the invention is not limited thereto. For example, the dragging part 32 can be an iron wire, a steel wire, or a rope. The sitting portion 12 and the back portion 11 respectively are but not limited to a plate structure for structural simplification.

As shown in FIG. 2, FIG. 3, and FIG. 6 to FIG. 8, in the embodiment, the back portion 11 is rotatable upward and downward on the base 20, so that the back portion 11 can rotate upward and downward relative to the base 20, which can meet a requirement for supporting the back of a child by the back portion 11 in different positions. The sitting portion 12 is movable backward and forward on the base 20, so that the sitting portion 12 can move backward and forward relative to the base 20, which can meet a requirement for supporting the buttocks of a child by the sitting portion 12 in different positions. However, the invention is not limited thereto; for example, the back portion 11 and the sitting portion 12 move relative to the base 20 in other modes in other embodiments. In this embodiment, as shown in FIG. 2, FIG. 3, FIG. 6 and FIG. 7, an rear end of the sitting portion 12 and a lower end of the back portion 11 are pivotally connected with each other about a pivotal connection axis P1, so that when moving backward and forward, the sitting portion 12 can reliably drive the back portion 11 to rotate downward and upward, and so that when rotating upward and downward, the back portion 11 can reliably drive the sitting portion 12 to move forward and backward. Therefore, the linking movement between the sitting portion 12 and the back portion 11 is more reliable. Similarly, the back portion 11 and the base 20 are pivotally connected with each other about a pivotal connection axis P2. The pivotal connection axis P2 is the axle center of a cross bar 36, which will be described in the following, so that the back portion 11 pivots about the pivotal connection axis P2 leading to an upward and downward rotation movement. Preferably, an upper end of the back portion 11 is pivotally connected with the base 20, which is realized through a cross bar 36; therein, the cross bar 36 is fixed on the base 20, and the back portion 11 is rotatable about the cross bar 36, so that the back portion 11 is pivotally connected with the base 20 through the cross bar 36. The pivotal connection axis P2 for the back portion 11 and the base 20 is located above and behind the pivotal connection axis P1 for the sitting portion 12 and the back portion 11, so that the manipulator can save effort in rotating the sitting portion 12 and the back portion 11 relatively. Thereby, when the back portion 11 is driven to pivot upward about the pivotal connection axis P2 leading to a forward movement of the sitting portion 12, or when the sitting portion 12 is driven to move forward leading to a upward rotation of the back portion 11 about the pivotal connection axis P2, the child safety seat 100 is switched to be in the lying status as shown by FIG. 5 or FIG. 6 for meeting a lying request by a child. When the back portion 11 is driven to pivot downward about the pivotal connection axis P2 leading to a backward movement of the sitting portion 12, or when the sitting portion 12 is driven to move backward leading to a backward rotation of the back portion 11 about the pivotal connection axis P2, the child safety seat 100 is switched to be in the sitting status as shown by FIG. 1 or FIG. 2.

Please refer to FIG. 2, FIG. 6 and FIG. 8. In the embodiment, the position of the pivotal connection axis P1 changes as the child safety seat 100 is switched between the lying status as shown by FIG. 6 or FIG. 8 and the sitting status as shown by FIG. 2. Furthermore, referring to FIG. 2 and FIG. 6, the pivotal connection axis P1 for the sitting portion 12 and the back portion 11 is higher when the child safety seat 100 is in the lying status than when the child safety seat 100 is in the sitting status. In another aspect, when the child safety seat 100 is switched between the lying status as shown by FIG. 6 and the sitting status as shown by FIG. 2, a vertical distance D2 between the base 20 and the pivotal connection axis P1 for the sitting portion 12 and the back portion 11 when the child safety seat 100 is in the lying status is larger than a vertical distance D1 between the base 20 and the pivotal connection axis P1 for the sitting portion 12 and the back portion 11 when the child safety seat 100 is in the sitting status. In another aspect, when the child safety seat 100 is switched between the lying status as shown by FIG. 6 and the sitting status as shown by FIG. 2, the location of the front end of the sitting portion 12 when the child safety seat 100 is in the lying status is beyond the location of the front end of the sitting portion 12 when the child safety seat 100 is in the sitting status. However, the invention is not limited thereto. For the convenience of carrying the child safety seat 100, the base 20 is equipped with a carry handle across the left and right sides of the base 20. For providing the child comfort in sitting, the seat part 10 further includes a head rest portion 13 which is adjustably installed to the back portion 11. In the embodiment, the head rest portion 13. The head rest portion 13 is slidably connected to the back portion 11; therein, a head rest positioning mechanism and a head rest adjustment mechanism (not shown in the figures) are disposed between the head rest portion 13 and the back portion 11, and the manipulation of the adjustment mechanism 30 will not interfere with the operation of the head rest adjustment mechanism. However, the invention is not limited thereto. For example, the head rest portion 13 can be disposed on the back portion 11 by other movement relationships by actual requests in other embodiments.

Figure 3:
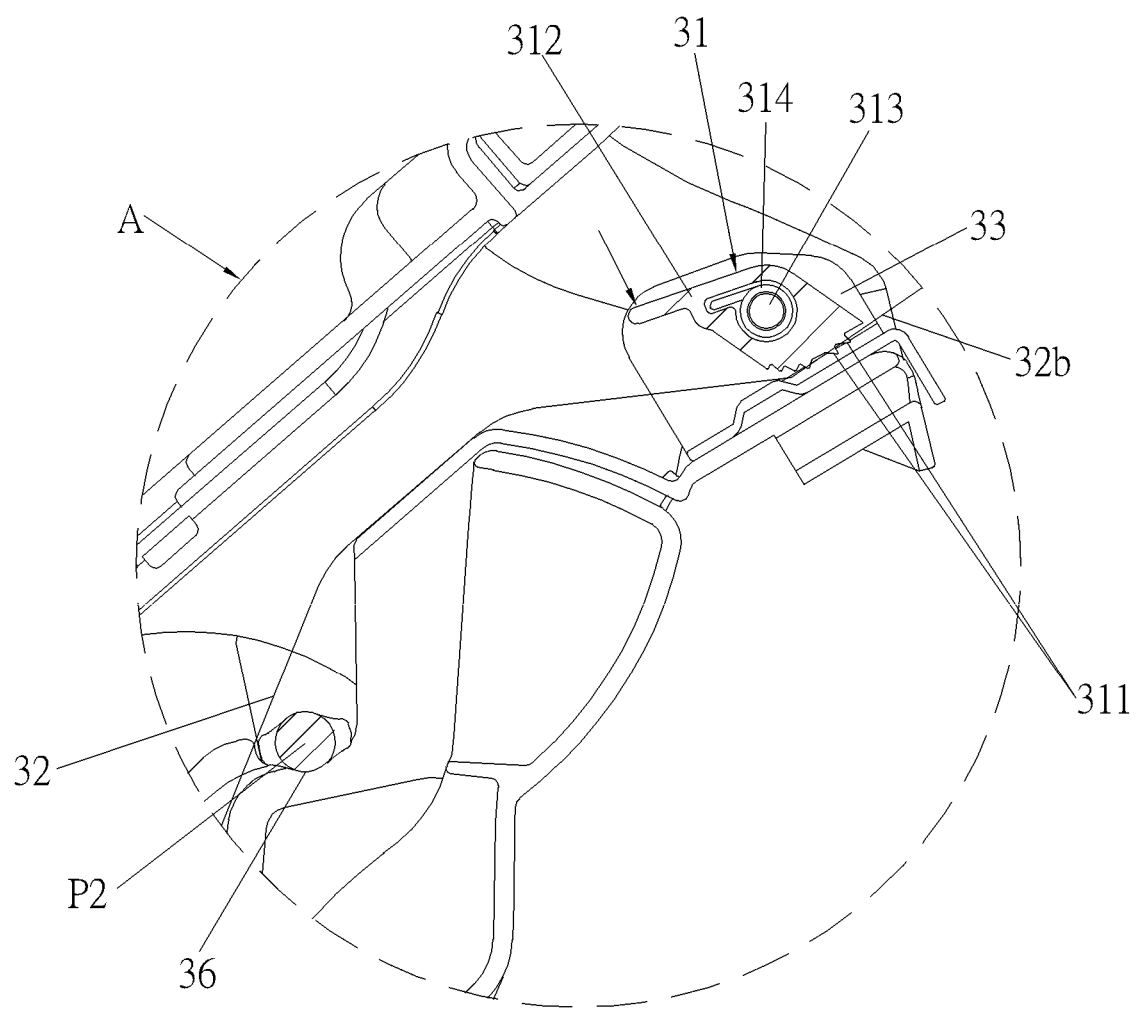
FIG. 3 is an enlarged view of the portion A in FIG. 2.
Figure 4:
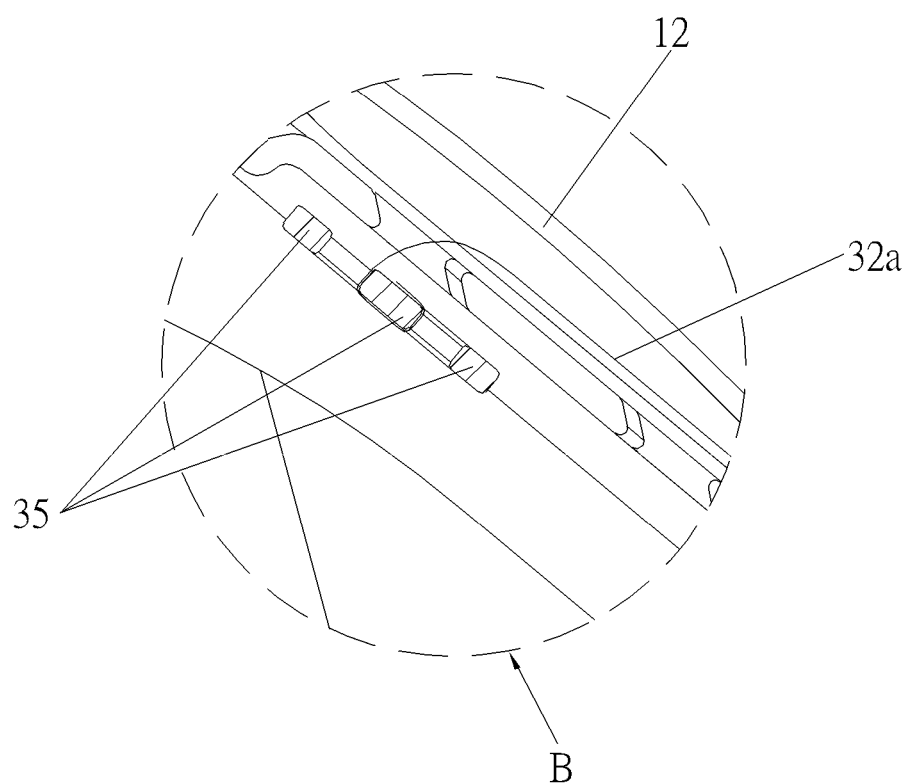
FIG. 4 is an enlarged view of the portion B in FIG. 2.
Figure 7:
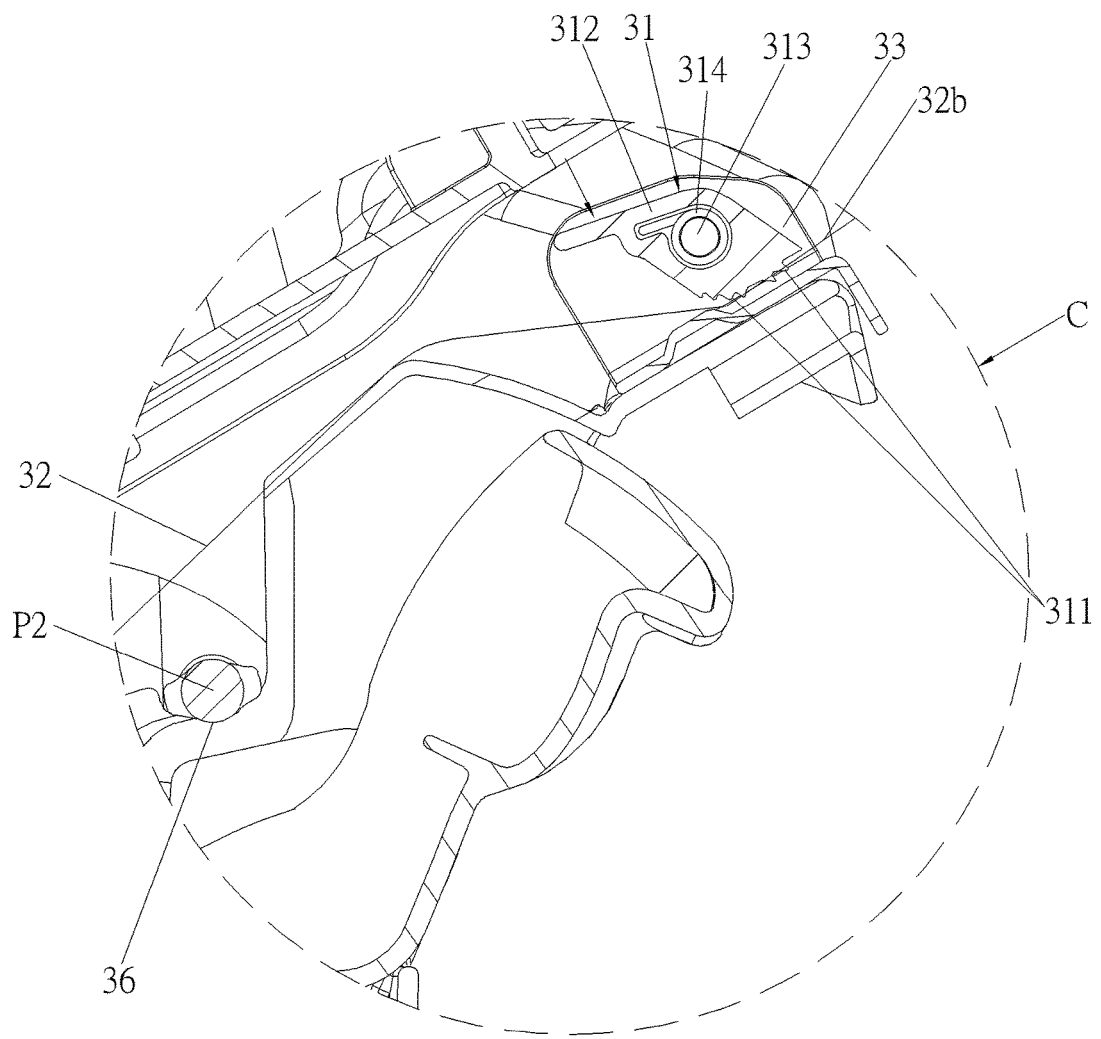
FIG. 7 is an enlarged view of the portion C in FIG. 6.

As shown in FIG. 2, FIG. 3, and FIG. 6 to FIG. 8, the adjustment mechanism 30 further includes a positioning mount 33. The positioning mount 33 is installed on the base 20. The positioning structure 31 is movably disposed on the positioning mount 33. The positioning structure 31 and the positioning mount 33 clamp or release the manipulation end 32*b* in a movement of the positioning structure 31 relative to the positioning mount 33. It is inferred that the clamping of the manipulation end 32*b* is implemented by the positioning structure 31 in coordination with the positioning mount 33, so the manipulation end 32*b* passes through the positioning structure 31 and the positioning mount 33, as shown by FIG. 3 and FIG. 7. In detail, for enhancing the reliability of the positioning structure 31 and the positioning mount 33 fixing the manipulation end 32*b*, the positioning structure 31 has a positioning portion 311 which cooperates with the positioning mount 33 to clamp or release the manipulation end 32*b*. Preferably, the positioning portion 311 is a sawtooth structure. The sawtooth structure is preferably formed on an end portion of the positioning structure 31 opposite to the manipulation end 32*b*. The sawtooth structure and the positioning mount 33 are used for clamping or releasing the manipulation end 32*b* together. Because the positioning structure 31 has the sawtooth structure for clamping the manipulation end 32*b*, the positioning structure 31 clamps the manipulation end 32*b* in multiple contacts in coordination with the positioning mount 33. Therefore, the clamped manipulation end 32*b* is more stably fixed and it is difficult to move the clamped manipulation end 32*b*, which maintains the structural status of the child safety seat 100 after adjusted. For the convenience of the manipulator manipulating the positioning structure 31, the positioning structure 31 further includes a manipulation portion 312, which the manipulator can manipulate to make the positioning portion 311 fix or release the manipulation end 32*b*. The positioning structure 31 is rotatably disposed on the positioning mount 33. Preferably, the positioning structure 31 is rotatably disposed on the positioning mount 33 through a install shaft 313, and the manipulation portion 312 and the positioning portion 311 are arranged at two sides of the install shaft 313, so that the manipulator can manipulate the manipulation portion 312 to drive the positioning portion 311 to rotate about the install shaft 313 to selectively fix or release the manipulation end 32*b*. A resilient part 314 is connected to and between the positioning structure 31 and the positioning mount 33. The resilient part 314 has a tendency to drive the positioning structure 31 to rotate to clamp the manipulation end 32*b*, so that the positioning structure 31 will return to its original position when the manipulator stops applying force to the positioning structure 31. Therefore, the operation of clamping the manipulation end 32b is more convenient and quick. Preferably, the resilient part 314 is but not limited to a torsion spring. As shown by FIG. 3 and FIG. 7, the positioning structure 31 rotates in a first direction (i.e. clockwise direction) to cooperate with the positioning mount 33 to clamp the manipulation end 32b. Because a child sitting on the child safety seat 100 applies a downward force to the child safety seat 100, the manipulation end 32b is clamped more tightly by the positioning structure 31 and the positioning mount 33, which ensures the safety of the child sitting on the child safety seat 100. When the manipulator presses the manipulation portion 312 of the positioning structure 31 in a direction indicated by an arrow beside the positioning structure 31 in FIG. 3 or FIG. 7, the positioning structure 31 is driven to rotate in a second direction (i.e. counterclockwise direction) so that the sawtooth structure departs from the manipulation end 32b. At the moment, the clamping of the manipulation end 32b is released by the positioning structure 31, so it is convenient for the manipulator to drag the dragging part 32 for an angle adjustment of the child safety seat 100. As shown by FIG. 2, FIG. 6 and FIG. 8, the positioning mount 33 is located at a rear portion of the base 20 relative to the back portion 11 of the seat part 10, preferably under a portion of the base 20 corresponding to the back portion 11. The connection end 32a is connected to a front portion of the base 20 (relative to the sitting portion 12 of the seat part 10). Thereby, after pressing the manipulation portion 312 of the positioning structure 31 in the direction indicated by the arrow beside the manipulation portion 312 in FIG. 3 or FIG. 7 to release the manipulation end 32b, the manipulator can move the dragging part 32 upward by dragging the manipulation end 32b so as to switch the child safety seat 100 from the sitting status as shown by FIG. 2 to the lying status as shown by FIG. 6. Furthermore, without manipulating the manipulation end 32b, the manipulator can directly press the back portion 11 or the sitting portion 12 of the seat part 10 by hand so as to switch the child safety seat 100 from the lying status as shown by FIG. 6 to the sitting status as shown by FIG. 2. However, the invention is not limited thereto; for example, the positioning mount 33 is disposed at a front portion of the base 20 and the connection end 32a is connected to a rear portion of the base 20 correspondingly. In this example, the manipulator can release the positioning structure 31 and manipulate the dragging part 32 at the front of the base 20 for switching the child safety seat 100 between the lying status and the sitting status. In addition, in the embodiment, for convenience of the manipulator to manipulate the adjustment mechanism 30 of the child safety seat 100, the dragging part 32 is disposed under the sitting portion 12 and the back portion 11 and extends along lower outside walls of the sitting portion 12 and the back portion 11 in a direction from the front to the rear of the child safety seat 100, which adapts the disposition of the positioning mount 33 at the rear portion of the base 20; however, the invention is not limited thereto.

Figure 10:
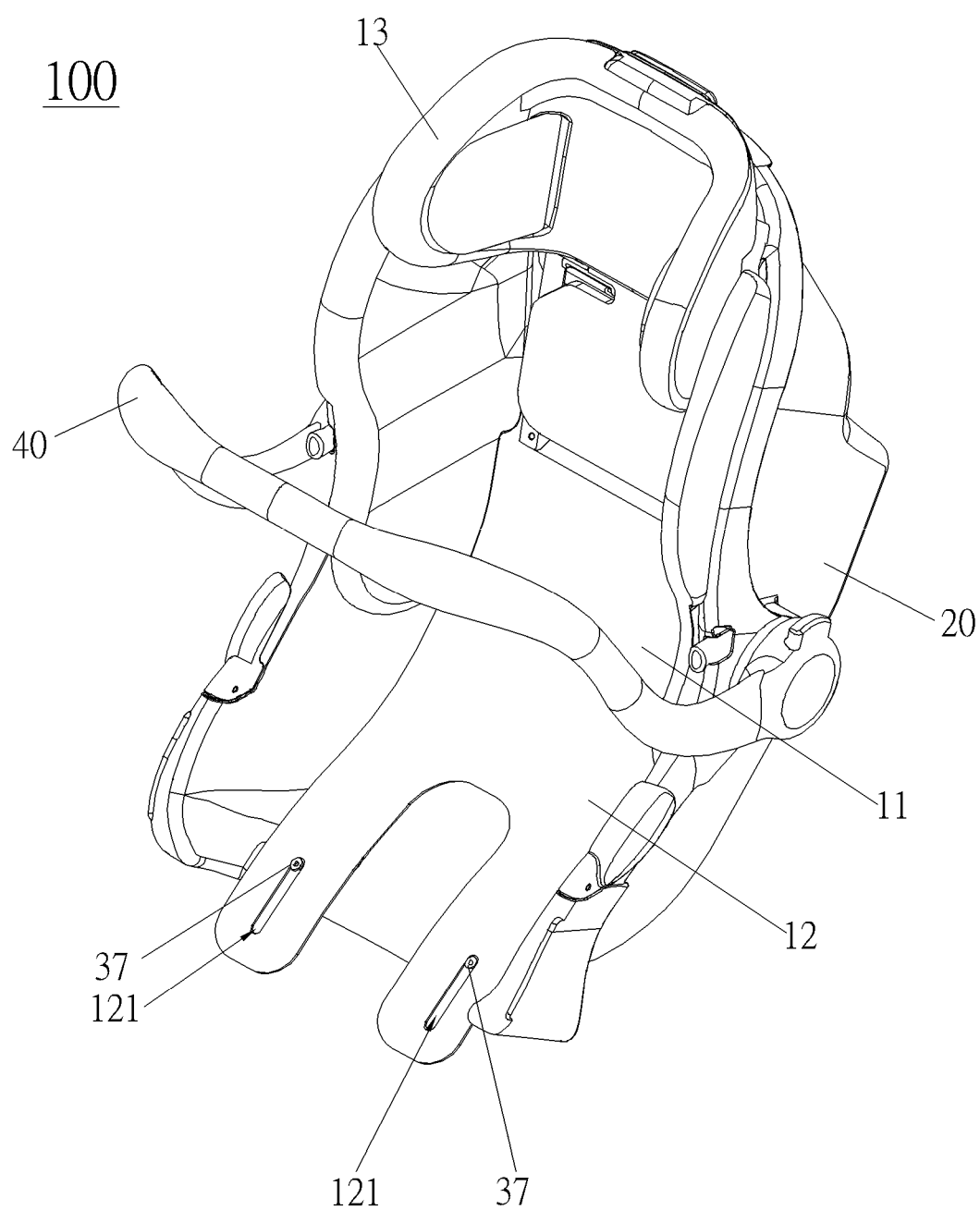
FIG. 10 is a schematic diagram illustrating the child safety seat of the first embodiment according to the invention when the child safety seat is in the lying status in another view point.

As shown in FIG. 1, FIG. 5 and FIG. 10, a limitation stopper 37 is disposed on one of the base 20. A long slot structure 121 is disposed on the seat part 10. Preferably, in the embodiment, the slot structure 121 is formed at a front end portion of the sitting portion 12 of the seat part 10 and extends in a front-to-rear direction of the child safety seat 100; however, the invention is not limited thereto. For example, the slot structure 121 can be formed on the back portion 11 by actual requests. In the embodiment, the limitation stopper 37 is disposed in the slot structure 121 and can slide in the slot structure 121, which provides guidance to the sitting portion 12 when the sitting portion 12 and the back portion 11 relatively pivot, so that the relative movement of the sitting portion 12 and the back portion 11 is more stable and reliable. Preferably, the limitation stopper 37 is provided in a post structure so as to be capable of sliding in the slot structure 121. There are two limitation stoppers 37 arranged on the base 20 at left and right sides relative to the front-to-rear direction of child safety seat 100; each limitation stopper 37 corresponding one slot structure 121. As shown by FIG. 5, the limitation stopper 37 contacts an inner wall of a rear end of the slot structure 121 when the child safety seat 100 is in the lying status. As shown by FIG. 1, the limitation stopper 37 contacts an inner wall of a front end of the slot structure 121 when the child safety seat 100 is in the sitting status. Thereby, the child safety seat 100 can reliably remain in the sitting status and the lying status by the contacts of the limitation stopper 37 with the inner walls of the front and rear ends of the slot structure 121 respectively. It is inferred that in other embodiments, the limitation stopper 37 can be disposed on the seat part 10 and the slot structure 121 is formed on the base 20 accordingly, which also can perform the above guidance effect.

Please refer to FIG. 1 to FIG. 10 together. The switching principle by which the child safety seat according to the first embodiment is switched between the lying status and the sitting status will be described in the following. When the child safety seat 100 is required to be switched from the sitting status as shown in FIG. 1 or FIG. 2 to the lying status as shown in FIG. 5, FIG. 6 or FIG. 8, the manipulator presses the manipulation portion 312 of the positioning structure 31 in the direction indicated by the arrow beside the positioning structure 31 in FIG. 3 or FIG. 7, so that the positioning structure 31 is driven to rotate about the install shaft 313 and drive the positioning portion 311 to depart from the manipulation end 32b of the dragging part 32; then, the manipulation end 32b is released so that the manipulator is allowed to manipulate the dragging part 32. Afterward, the manipulator can pull manipulation end 32b upward, so that the contact portion of the dragging part 32 contacting the sitting portion 12 and the back portion 11 is decreased, the dragging part 32 drives the pivotal connection axis P1 to move upward and drives the sitting portion 12 to move forward relative to the base 20, and the back portion 11 rotates upward about the cross bar 36, which makes the child safety seat 100 switched from the sitting status as shown in FIG. 1 or FIG. 2 to the lying status as shown in FIG. 5, FIG. 6 or FIG. 8. When the child safety seat 100 is switched to be the lying status as shown in FIG. 5, FIG. 6 or FIG. 8, the manipulator releases the pressing on the manipulation portion 312 of the positioning structure 31, so that the positioning structure 31 rotates back to its original position under a resilient force by the resilient part 314 and the positioning structure 31 at its original position clamps the manipulation end 32b tight in coordination with the positioning mount 33. After the manipulation end 32b is clamped tight, the manipulator releases the pulling on the manipulation end 32b and the switching of the child safety seat 100 from the sitting status to the lying status is completed accordingly. When the child safety seat 100 is required to be switched from the lying status as shown in FIG. 5, FIG. 6 or FIG. 8 to the sitting status as shown in FIG. 1 or FIG. 2, the manipulator presses the manipulation portion 312 of the positioning structure 31 in the direction indicated by the arrow beside the positioning structure 31 in FIG. 3 or FIG. 7, so that the positioning structure 31 is driven to rotate about the install shaft 313 and drive the positioning portion 311 of the positioning structure 31 to depart from the manipulation end 32b. Afterward, the manipulator can push the sitting portion 12 or the back portion 11 down, so that the contact portion of the dragging part 32 contacting the sitting portion 12 and the back portion 11 increases, the dragging part 32 drives the pivotal connection axis P1 to move downward and drives the sitting portion 12 to move rearward relative to the base 20, and the back portion 11 rotates downward about the cross bar 36, which makes the child safety seat 100 switched from the lying status as shown in FIG. 5, FIG. 6 or FIG. 8 to the sitting status as shown in FIG. 1 or FIG. 2. When the child safety seat 100 is switched to be the sitting status as shown in FIG. 1 or FIG. 2, the manipulator releases the pressing on the manipulation portion 312 of the positioning structure 31, so that the positioning structure 31 rotates back to its original position under a resilient force by the resilient part 314 and then clamps the manipulation end 32b, which realizes the switching of the child safety seat 100 from the lying status to the sitting status. Therein, in the switching of the child safety seat 100 between the lying status and the sitting status, the cooperation of the limitation stopper 37 with the slot structure 121 provides guidance to the forward and rearward sliding of the sitting portion 12 and also makes the child safety seat 100 reliably remain in the lying status and the sitting status selectively.

Figure 11:
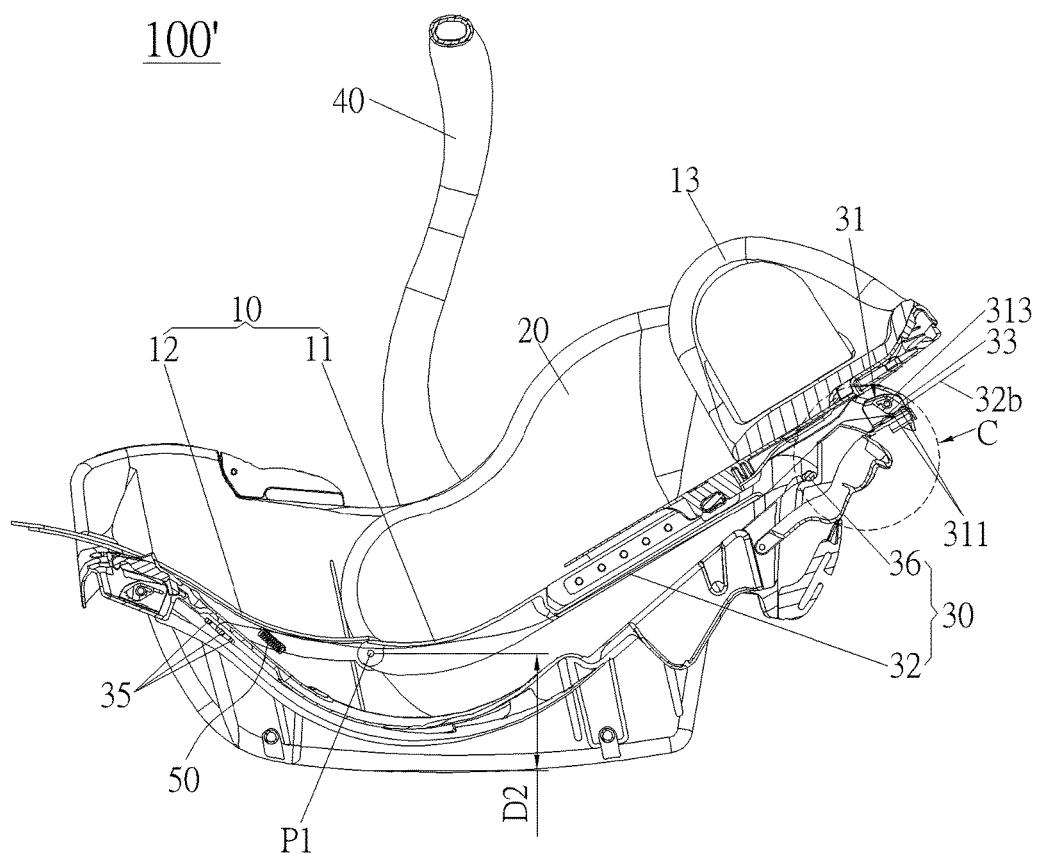
FIG. 11 is a sectional view of a child safety seat of a second embodiment according to the invention cut in a longitudinal direction for illustrating the inner structure of the child safety seat when the child safety seat is in a lying status.

Please refer to FIG. 11, which illustrates a child safety seat of a second embodiment according to the invention. The child safety seat 100' of this embodiment and the child safety seat 100 of the first embodiment are substantially the same in structure. The difference between the child safety seat 100' and the child safety seat 100 is that the child safety seat 100' further includes a restoring part 50. Preferably, the restoring part 50 is a spring disposed between the base 20 and the seat part 10. In an embodiment, the restoring part 50 is disposed between the base 20 and the sitting portion 12. By use of the restoring part 50 having a tendency to drive the sitting portion 12 to move backward or drive the back portion 11 to pivot downward, the manipulator can just release the positioning structure 31 for switching the child safety seat 100' from the lying status to the sitting status; therein, the restoring part 50 drives the sitting portion 12 and the back portion 11 to return. Therefore, it is more convenient and quick to switch the child safety seat 100' of this embodiment from the lying status to the sitting status.

Compared with the prior art, according to the invention, the sitting portion 12 and the back portion 11 are movably disposed on the base 20. The sitting portion 12 and the back portion 11 are pivotally connected with each other. The sitting portion 12 and the back portion 11 are rotatable relatively to make the child safety seat 100 in a lying status or a sitting status. Therefore, the child safety seat 100 can be adjusted to be in the lying status or the sitting status by request of a child, so that the child safety seat 100 can provide more comfortable sitting to the child and meet requests of children with different heights. Furthermore, the adjustment mechanism 30 according to the invention includes the positioning structure 31 and the dragging part 32. The positioning structure 31 is movably disposed on the base 20 or the seat part 10. The dragging part 32 has the connection end 32a and the manipulation end 32b. The connection end 32a is connected to the base 20. The manipulation end 32b extends toward the positioning structure 31. The positioning structure 31 selectively fixes or releases the manipulation end 32b. Therefore, when the positioning structure 31 releases the manipulation end 32b, the manipulator can adjust the dragging part 31 through the manipulation end 32b so that the dragging part 31 drives the sitting portion 12 and the back portion 11 to pivot relatively to switch the child safety seat 100 between the lying status and the sitting status. Thereby, the switching of the child safety seat 100 between the lying status and the sitting status is more convenient and quick. Furthermore, because the adjustment mechanism 30 according to the invention can conveniently and quickly adjust the structural status of the child safety seat 100 through the dragging part 32 in coordination with the positioning structure 31, the adjustment mechanism 30 is structurally simple.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustment mechanism used in a child safety seat, the child safety seat comprising a seat part and a base, the seat part comprising a back portion and a sitting portion, the back portion and the sitting portion being movably disposed on the base, the back portion and the sitting portion being pivotally connected with each other, the back portion and the sitting portion being rotatable relatively to make the child safety seat in a lying status or a sitting status, the adjustment mechanism comprising:

a positioning structure, the positioning structure being movably disposed on the base or the seat part; and a dragging part, the dragging part being under the sitting portion and having a connection end and a manipulation end, the connection end being connected to the base, the manipulation end extending toward the positioning structure, the positioning structure selectively fixing or releasing the manipulation end;

wherein when the positioning structure releases the manipulation end, the manipulation end can be manipulated by a manipulator to make the sitting portion and the back portion pivot relatively so that the child safety seat is switched between the lying status and the sitting status, and when the positioning structure fixes the manipulation end, the child safety seat is fixed in the lying status or the sitting status.

2. The adjustment mechanism of claim 1, further comprising a positioning mount, wherein the positioning structure is movably disposed on the base through the positioning mount, the positioning mount is installed on the base, the positioning structure is movably disposed on the positioning mount, and the positioning structure and the positioning mount clamp or release the manipulation end in a movement of the positioning structure relative to the positioning mount.

3. The adjustment mechanism of claim 2, wherein a resilient part is connected to and between the positioning structure and the positioning mount, the positioning structure is rotatably disposed on the positioning mount, and the resilient part has a tendency to drive the positioning structure to rotate to clamp the manipulation end.

4. The adjustment mechanism of claim 2, wherein the positioning structure has a manipulation portion and a positioning portion, and the manipulation portion is manipulated by the manipulator to make the positioning portion fix or release the manipulation end.

5. The adjustment mechanism of claim 2, wherein the positioning mount is disposed under a portion of the base corresponding to the back portion.

6. The adjustment mechanism of claim 1, wherein the dragging part is under the back portion, and the dragging part is disposed along lower outside walls of the sitting portion and the back portion in a direction from the front to the rear of the child safety seat.

7. The adjustment mechanism of claim 1, wherein the connection end of the dragging part is under the sitting portion, the manipulation end of the dragging part is under the back portion, a fixing piece is installed where the connection end and the base are connected, and the fixing piece fixes the connection end.

8. The adjustment mechanism of claim 1 wherein an upper end of the back portion is pivotally connected with the base, and a lower end of the back portion is pivotally connected with a rear end of the sitting portion.

9. The adjustment mechanism of claim 1, wherein the dragging part is a flexible dragging part.

10. The adjustment mechanism of claim 1, wherein the back portion and the sitting portion respectively are a plate structure.

11. The adjustment mechanism of claim 1, wherein a limitation stopper is disposed on one of the base and the seat part, a long slot structure is disposed on the other one of the base and the seat part, and the limitation stopper is slidably disposed in the slot structure.

12. The adjustment mechanism of claim 1, wherein a restoring part is connected to and between the base and the seat part, and the restoring part has a tendency to drive the sitting portion and the back portion to relatively pivot to switch the child safety seat to be in the sitting status.

13. A child safety seat, comprising:
a base;
a seat part, the seat part comprising a back portion and a sitting portion, the back portion and the sitting portion being movably disposed on the base, the back portion and the sitting portion being pivotally connected with each other about a pivotal connection axis, the back portion and the sitting portion being rotatable relatively to make the child safety seat in a lying status or a sitting status; and
an adjustment mechanism, comprising:
a positioning structure, the positioning structure being movably disposed on the base or the seat part; and
a dragging part, the dragging part being under the sitting portion and having a connection end and a manipulation end, the connection end being connected to the base, the manipulation end extending toward the positioning structure, the positioning structure selectively fixing or releasing the manipulation end;
wherein the manipulation end can be manipulated to switch the child safety seat between the lying status and the sitting status, and a position of the pivotal connection axis changes as the child safety seat is switched.

14. The child safety seat of claim 13, wherein the adjustment mechanism further comprises a positioning mount, the positioning structure is movably disposed on the base through the positioning mount, the positioning mount is installed on the base, the positioning structure is movably disposed on the positioning mount, and the positioning structure and the positioning mount clamp or release the manipulation end in a movement of the positioning structure relative to the positioning mount.

15. The child safety seat of claim 14, wherein a resilient part is connected to and between the positioning structure and the positioning mount, the positioning structure is rotatably disposed on the positioning mount, and the resilient part has a tendency to drive the positioning structure to rotate to clamp the manipulation end.

16. The child safety seat of claim 14, wherein the positioning structure has a manipulation portion and a positioning portion, and the manipulation portion is manipulated by the manipulator to make the positioning portion fix or release the manipulation end.

17. The child safety seat of claim 14, wherein the positioning mount is disposed under a portion of the base corresponding to the back portion.

18. The child safety seat of claim 13, wherein the dragging part is under the back portion, and the dragging part is disposed along lower outside walls of the sitting portion and the back portion in a direction from the front to the rear of the child safety seat.

19. The child safety seat of claim 18, wherein the connection end of the dragging part is under the sitting portion, and the manipulation end of the dragging part is under the back portion, a fixing piece is installed where the connection end and the base are connected, and the fixing piece fixes the connection end.

20. The child safety seat of claim 13, wherein an upper end of the back portion is pivotally connected with the base, and a lower end of the back portion is pivotally connected with a rear end of the sitting portion.

21. The child safety seat of claim 13, wherein the dragging part is a flexible dragging part.

22. The child safety seat of claim 13, wherein the back portion and the sitting portion respectively are a plate structure.

23. The child safety seat of claim 13, wherein a limitation stopper is disposed on one of the base and the seat part, a long slot structure is disposed on the other one of the base and the seat part, and the limitation stopper is slidably disposed in the slot structure.

24. The child safety seat of claim 13, wherein a restoring part is connected to and between the base and the seat part, and the restoring part has a tendency to drive the sitting portion and the back portion to relatively pivot to switch the child safety seat to be in the sitting status.

25. The child safety seat of claim 13, wherein the position of the pivotal connection axis is changed by the dragging part.

* * * * *